H. B. ROSS.
CUTTER HEAD FOR GROOVING MACHINES.
APPLICATION FILED MAY 31, 1906.
937,962.
Patented Oct. 26, 1909.
2 SHEETS—SHEET 1.
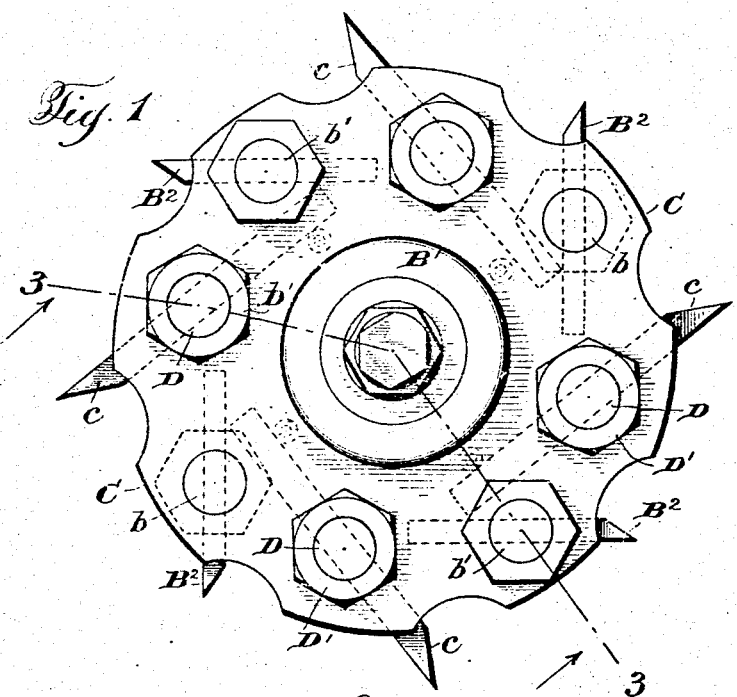
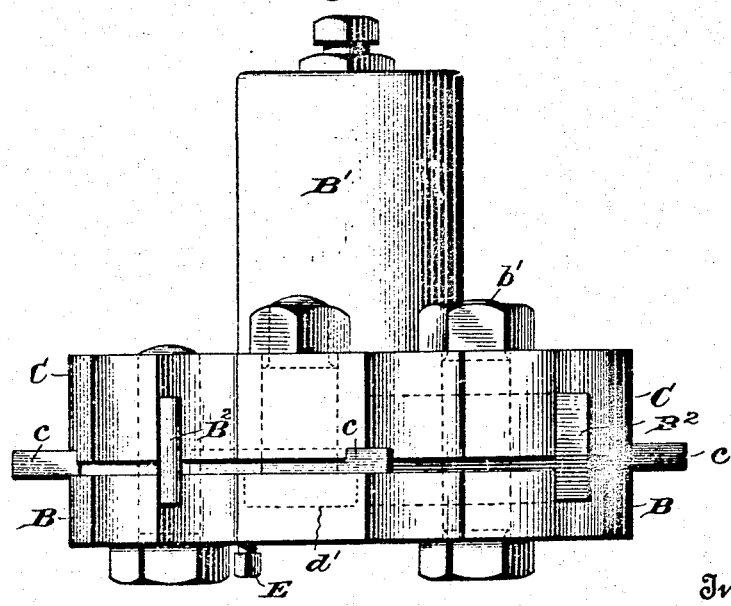
Witnesses:
Jas. E. Hutchinson
Nellie F. Rowe
Inventor:
Harry B. Ross
By Bacon & Milans Attorneys

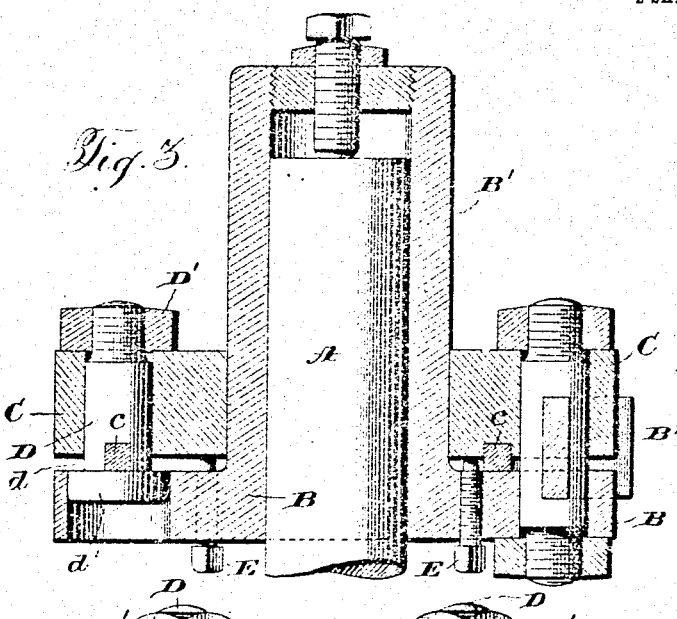
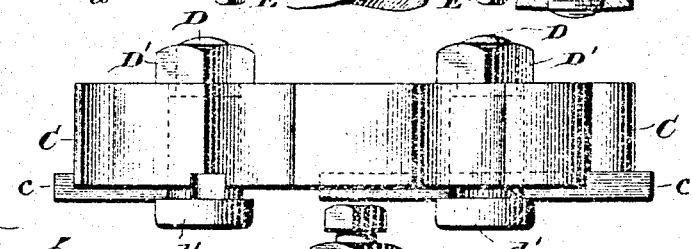
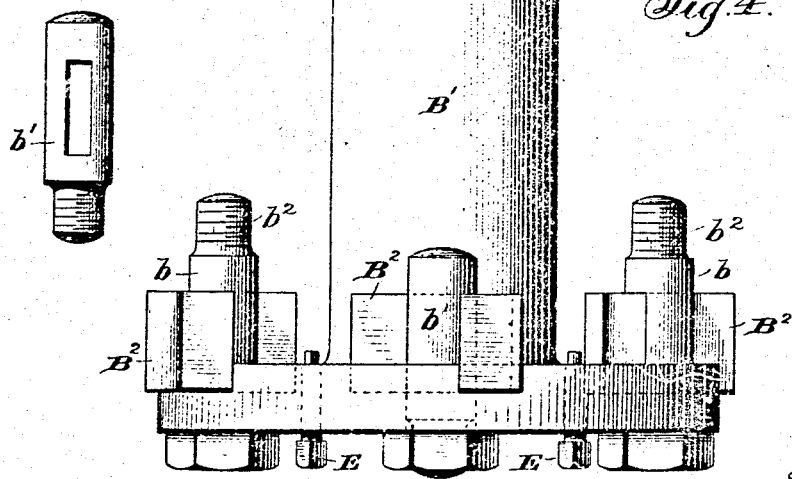

UNITED STATES PATENT OFFICE.

HARRY B. ROSS, OF BELOIT, WISCONSIN, ASSIGNOR TO THE BERLIN MACHINE WORKS, OF BELOIT, WISCONSIN.

CUTTER-HEAD FOR GROOVING-MACHINES.

937,962.  Specification of Letters Patent.  Patented Oct. 26, 1909.

Application filed May 31, 1906. Serial No. 319,377.

*To all whom it may concern:*

Be it known that I, HARRY B. Ross, a citizen of the United States, residing at Beloit, in the county of Rock and State of Wisconsin, have invented certain new and useful Improvements in Cutter-Heads for Grooving-Machines, of which the following is a specification, reference being had therein to the accompanying drawing.

This invention relates to an improved cutter head for grooving machines and is embodied in the construction and arrangement of parts to be described and defined in the claims.

In its general application, the present invention is designed for use in connection with machines for cutting grooves in the edges of boards into which groove a tongue is designed to fit, that is to say, forming the conventional groove as one of the component parts of the tongue and groove joint.

Heretofore grooving machines of this type have had cutter heads wherein the grooving cutters were arranged at the center plane of the head and the planing cutters were arranged alternately and being of sufficient width to plane off the edge of the board, the planing cutters and grooving cutters or bits being alternately arranged. While it is a matter of no particular importance to secure a properly finished surface to the bottom of the groove, it is important that the outer surface or edge of the blank or board should be properly planed and finished. To acquire this it is necessary to have the planing cutters properly positioned so as to be substantially uniform as to the concentricity of the cutting edges. To secure this proper uniform positioning of the cutter edges of the planing cutters, it is exceedingly difficult when adjustment is resorted to.

My invention is designed to enable the cutters to be made perfectly true as to their relative positions by permitting them to be ground down while the head is under speed and so without interfering with the more extensively projected grooving cutters.

While the cutting edges of the planer knives may be adjusted to exactly the same radial distances from the axis of the head, yet, owing to possible eccentricity in the shaft of the cutter-head under speed, such adjustment does not avoid irregularity and unevenness in the planed surfaces; but where the planer knives are ground while the head is under normal operative speed, this unevenness can be avoided, since the cutting edges may thereby be formed at equal distances from the center of rotation of the head.

With the above aim in view, the invention resides in a construction of cutter-head hereinafter described and claimed, which permits the grooving cutters, which normally project beyond the circular path of the planing cutters, to be removed, when desired, so as to permit the head carrying the planing knives to be rotated at full normal speed against a fixed grinding surface.

In the drawings, I have shown an embodiment of the invention but it is to be understood that the essential characteristic of the invention can be secured by various other structures, modifications or changes without departing from the invention.

Figure 1 is a top plan view of the cutter head, Fig. 2 is a side elevation, Fig. 3 is a longitudinal vertical section, Fig. 4 is an elevation showing the grooving cutter head removed, and Fig. 5 is a detail view of a clamping bolt.

As is usual, the grooving cutter heads are arranged to revolve on a vertical axis which latter is represented at A, the head being sleeved over the shaft and secured thereon in any convenient manner.

B designates the planer head, and C the grooving head. The planer head is formed with a cylindrical bearing part B' and a flange part. In the flange part are formed the retaining seats for the planing knives B², the latter being clamped in the seats by slotted bolts $b$ and $b'$ passing through openings in the flange and capped by nuts, all of which is of usual and well known construction, with this variation that the bolts $b$ are formed with threaded upper ends $b^2$ as shown in Fig. 4. There are four planing cutters shown spaced equidistance apart and secured and clamped in place.

The removable grooving head C is in the form of a circular disk of considerable thickness and having a central bore fitting over the sleeve or cylindrical part B' of the planing cutter head. This head C carries the narrow grooving cutters $c$, the same fitting in properly fashioned retaining grooves and being there clamped in position by bolts D, the cutters passing through properly fashioned apertures d in the bolts as shown in Fig. 3. Conveniently the bolts are made with extended head parts d' against the upper surface of which the under face of the cutter rests so that as the bolt is drawn up tightly by the nut D' the cutter is forced closely and tightly into its seat in the head and is held from lateral movement by the walls of the seating groove, walls of the perforation and the extended surface of the head d' of the bolt.

It will be observed that all the grooving cutters are carried by the supplemental removable head C so that when the head is moved up, as shown in Fig. 4, the planer head can readily be presented to a cutter sharpener and thereby have the cutting edges ground uniform as to their position relative to the center or axis of rotation. To effect this independent removability of the grooving head C, the bolts b are, as stated, elongated and provided with threaded upper ends. These threaded upper ends are projected through apertures in the grooving cutter head and are capped by suitable nuts, as shown in Fig. 3, which serve the purpose of drawing the grooving cutter head tightly down into proper position relative to the planer cutter head. In practice, but two of such bolts will probably be necessary. To permit the movement of the heads relative to each other, suitable openings are made in the respective heads into which the ends of the headed bolts and bolts b' pass.

In some instances, it is desired to vary the position of the grooving cutters so as to make the cut more or less toward the edge of the board or plank and with that in view I have provided a series of set bolts E passing through the planer head with their upper ends arranged to bear against the grooving head. By adjusting these bolts up the grooving head is prevented from being lowered beyond the bolts E on which the head is securely clamped by the nuts on the bolts b.

In operation, it is only necessary to remove the two nuts on the bolts b and the operator can then slide the grooving cutter head from off the cylindrical part of the head B and thereafter present the cutters on the planer head to an emery or other grinding machine and true them up as well as to sharpen them when necessary. The positioning of the groove relative to the work is ascertained and the grooving cutter head is then properly adjusted and secured in place.

I am aware that rotary cutter-heads having a pair of coöperating cutter-heads each carrying a series of cutters and adjustable more or less relatively to each other to vary the size of a groove or bead cut thereby are old; but my invention is of an entirely different character and for an entirely different purpose from such devices.

Having thus described the invention, what is claimed as new and desired to be secured by Letters Patent is:—

1. A rotary cutter-head for grooving machines, comprising a cylindrical bearing member adapted to be mounted on the cutter-shaft, a radial flange thereon constituting a planer head, a series of planer knives in said planer head, a disk loosely sleeved on said cylindrical bearing member, a series of grooving cutters secured to said disk and projecting beyond the path of travel of the edges of said planer knives, and means for removably securing said disk to said planer head whereby to effect withdrawal of the grooving cutters from the plane of the planer knives to permit grinding of the latter at full speed.

2. A rotary cutter-head for grooving machines, comprising a cylindrical bearing member adapted to be mounted on the cutter shaft, a radial flange thereon constituting a planer head, a series of planer knives in said planer head, a disk loosely sleeved on said cylindrical bearing member, a series of grooving cutters secured to said disk and projecting beyond the path of travel of the edges of said planer knives, and bolts and nuts removably uniting said planer head and disk, whereby said last-named parts may be readily separated to permit the grinding of the planer knives without interference by said grooving cutters.

3. A rotary cutter-head for grooving machines, comprising a planer head and a grooving head adapted to be mounted side by side on a cutter-shaft, the adjacent surfaces of said heads being channeled to receive planing knives and grooving bits, respectively, a series of transversely slotted bolts secured in said planer head and extending into transverse openings in said grooving head, a corresponding series of planer knives seated in the channels of said planer head and passed through the slots of said bolts and clamped by the latter to said planer head, a series of transversely slotted bolts secured in said grooving head and extending into transverse openings in said planer head, a corresponding series of grooving bits seated in the channels of said grooving head and passed through the slots of said last-named bolts and clamped thereby to said grooving head, and means for securing said heads together, substantially as described.

In testimony whereof I affix my signature in presence of two witnesses.

HARRY B. ROSS.

Witnesses:
L. S. BACON,
EDWIN S. CLARKSON.